United States Patent [19]

Sundberg

[11] Patent Number: 4,936,880

[45] Date of Patent: Jun. 26, 1990

[54] SCRUBBER

[75] Inventor: Hardy Sundberg, Katrineholm, Sweden

[73] Assignee: Katrineholm Tekniska Skola, Katrineholm, Sweden

[21] Appl. No.: 382,644

[22] PCT Filed: Dec. 16, 1988

[86] PCT No.: PCT/SE88/00689

§ 371 Date: Sep. 18, 1989

§ 102(e) Date: Sep. 18, 1989

[87] PCT Pub. No.: WO89/05687

PCT Pub. Date: Jun. 29, 1989

[30] Foreign Application Priority Data

Dec. 21, 1987 [SE] Sweden ............................ 8705105

[51] Int. Cl.$^5$ ............................................. B01D 47/00
[52] U.S. Cl. ..................................... 55/222; 55/257.4; 55/259
[58] Field of Search ........................ 55/222, 259, 257.4

[56] References Cited

U.S. PATENT DOCUMENTS 1,940,197 12/1933 Wagner .................................. 55/222
3,585,786 6/1971 Hardison ............................. 55/257.4

FOREIGN PATENT DOCUMENTS 2115710 10/1972 Fed. Rep. of Germany .
454142 10/1986 Sweden .
1188524 4/1970 United Kingdom .

Primary Examiner—Bernard Nozick
Attorney, Agent, or Firm—Shapiro and Shapiro

[57] ABSTRACT

A scrubber comprises a casing (1) with an inlet (2) and an outlet (3) for flue gases, and with an outlet (4) for water and substances separated from the flue gases, and water injection nozzles. The casing (1) is divided, by means of a partition having a throughflow opening for flue gases, into an evaporation zone (11) in which injected water is caused to cool the flue gases by heat absorption and evaporation, simultaneously as the water adsorbs any substances carried along by the flue gases, and a condensation zone (12) in which flue gases and steam from said first zone are condensed. The flue gas outlet from the condensation zone is provided with a drop separator (8), and the partition (151) separating the two zones is arranged as a collector of water which has not evaporated in said evaporation zone and which by means of a pump (16) and further nozzles (17), is reinjected into said evaporation zone (11).

1 Claim, 1 Drawing Sheet

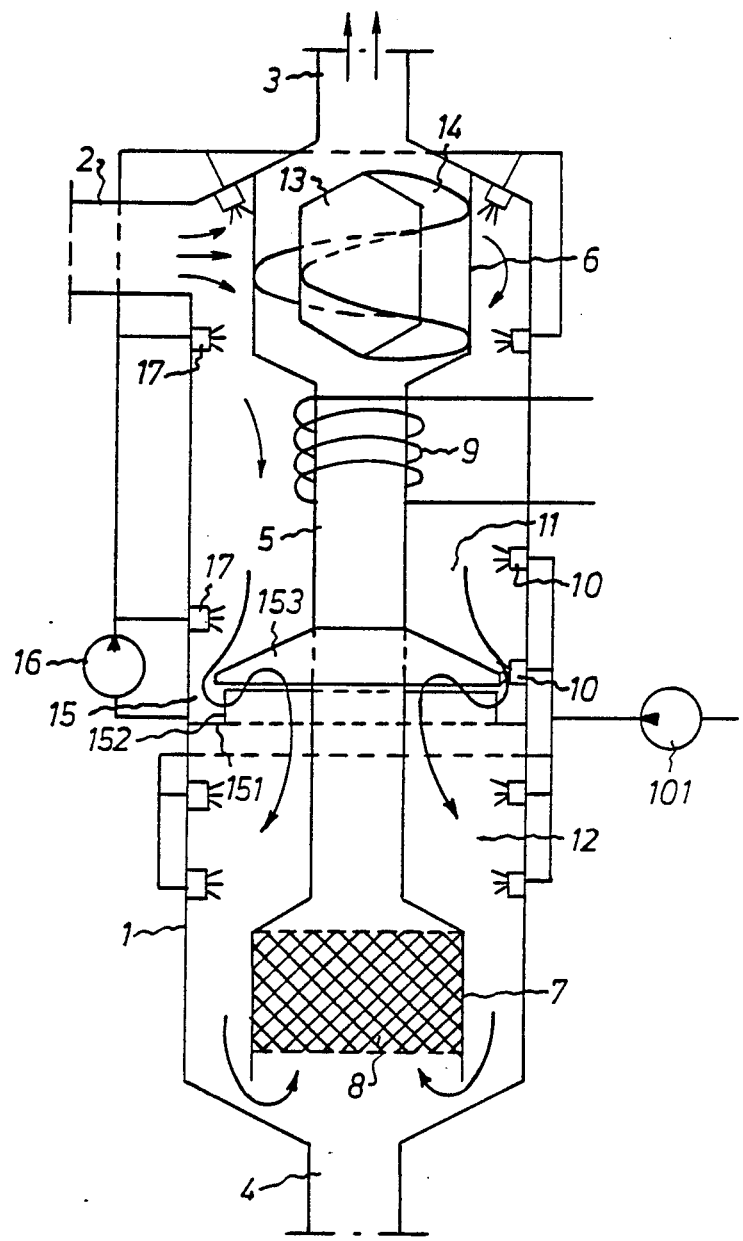

SCRUBBER

The present invention relates to a scrubber. More particularly, the invention relates to a scrubber for recovering the energy in hot flue gases and simultaneously reducing the moisture content of the discharged cooled flue gases and separating any substances carried thereby.

Because of the ever-growing fuel costs, and in spite of more efficient heating plants and control systems, it has become increasingly important to make available heat recovery systems affording a better utilisation of the energy content of the fuel, thereby to reduce the total cost of, for example, house heating. Besides, the increasing environmental pollution has stimulated the development of systems for separating pollutants from the flue gases emitted by heating plants. Heat recovery and flue gas purification are preferably carried out simultaneously in a so-called scrubber.

However, prior art scrubbers suffer from several disadvantages. For example, the moisture content of the discharged and intensely cooled flue gases is frequently far too high and may cause corrosion in the chimney or the smoke pipe. To eliminate this problem, the flue gases must therefore be reheated, and this requires a certain amount of energy which is obtained from a separate source of energy. If, on the other hand, the flue gases are not intensely cooled in the plant, their energy content will be recovered less effectively, simultaneously as the moisture content may still be high and cause corrosion. Special facilities must therefore be provided for reducing the moisture content.

It therefore is the object of this invention to obviate the disadvantages of prior art scrubbers and to provide a scrubber which effectively recovers the energy content of the flue gases and maintains the moisture content of the discharged flue gases at a low level. This is achieved by heating the discharged flue gases by heat exchange with the incoming hot flue gases, and by recovering the energy content of the hot flue gases by heat exchange and water injection in an evaporation zone by means of an arrangement which ensures adequate evaporation of the injected water, and in a condensation zone in which the water vapour is condensed. To this end, the scrubber of the present invention has been given the characteristic features stated in claim 1.

The invention will now be described in more detail below, reference being had to the accompanying drawing which is a schematic cross-sectional view of the scrubber according to the invention.

In its preferred embodiment, the scrubber according to the invention comprises a casing 1 having an inlet 2 for hot flue gases from, for example, a heating plant (not shown), an outlet 3 for discharged, cooled and purified flue gases, said outlet being connectible to a chimney or the like, and an outlet 4 for condensate, water and separated pollutants. An internal smoke pipe 5 connected to the outlet 3 extends through the centre of the casing 1.

The lower end of the smoke pipe 3, which is positioned near the condensate outlet 4, comprises a widened portion 7 which serves as a drop separator 8 and preferably is in the form of a coke bed. At its end connecting with the outlet 3, the smoke pipe also has a widened portion 6 whose function will be described later. Below the widened portion 6, a heat exchanger 9 is arranged which is shown schematically and adapted to recover, when need arises, part of the heat content of the flue gases.

Along its inner side, the casing 1 is provided with a number of nozzles 10 through which water from an external system is injected by means of a pump 101. It should here be added that the interior of the casing is divided, by means of partition to be described later, into an evaporation zone 11 and a condensation zone 12. The water injected through the nozzles 10 has a relatively low temperature and is heated and evaporated in the evaporation zone 11, while simultaneously lowering the temperature of the flue gases and adsorbing the pollutants therein. The cold water injected into the condensation zone 12 contributes to recovering the energy content of the flue gases and, by condensation, the energy content of the water vapour coming from the evaporation zone 11 and carried along by the flue gases.

The widened portion 6 of the smoke pipe contains a turbulator 13 which can be provided with a helical flange 14 or the like to improve the turbulence in the discharged flue gases. The widened portion 6 and the turbulator 13 therein also constitute a heat exchanger for heat exchange between the hot flue gases that have entered through the inlet 2 and flow around said portion 6, and the cooled flue gases discharged through the outlet 3. The flange 14 promotes the heat exchange between the hot and cold flue gases by forcing them in an outward direction. The heat exchanger causes the cooled flue gases flowing upwardly in the pipe 5 and having a relative air humidity of almost 100 percent and a temperature of about 15° C. to be reheated to about 25° C., whereby the relative air humidity of the flue gases is reduced to below 50 percent. In this manner, the corrosive action of the cold and relatively humid, discharged flue gases occurring in prior art arrangements thus is avoided.

For better energy economy and to improve the evaporation of water in the flue gases, a water collecting device 15 is provided between the evaporation zone 11 and the condensation zone 12. The collecting device 15 is formed by the partition 151 separating the evaporation zone 11 from the condensation zone 12 and has a central throughflow opening for flue gases and water vapour. The opening is surrounded by an upstanding collar 152, and above the opening a conical baffle 153 extends beyond the edges of the collar and guides nonevaporated water drops outside the collar such that the water is collected on the partition 151. The water which has collected on the partition and is injected into the evaporation zone 11 through the nozzles 10, is reinjected by means of a circulation pump 16 and nozzles 17 in the evaporation zone 11. The nozzles 17 are distributed throughout the evaporation zone 11, such that water jets are directed against the incoming flue gases which thus are cooled, simultaneously as the water is evaporated to a large extent. Water jets are directed also against the heat-absorbing surfaces to keep these surfaces clean and to form a water film which facilitates heat absorption. Because the recycled water has already been heated, the large absorption area gives a higher scrubbing action. The recirculation water in the evaporation zone 11 which is collected by the partition 151 will have a temperature above the dew point of the flue gases.

The scrubber according to the present invention operates as follows. Hot flue gases from a furnace, having a temperature of e.g. 250° C., enter through the inlet 2 in the casing 1 and come into contact with the widened portion 6 serving as heat exchanger. By heat exchange with cooled flue gases flowing within the portion 6, the temperature of the gases just entered is slightly lowered, while the temperature of the discharged flue gases is raised, simultaneously as the relative air humidity thereof is lowered. Part of the energy in the flue gases can then also be recovered in the heat exchanger 9.

In the evaporation and condensation zones 11 and 12, the flue gas temperature is lowered, by the injection of water, to about 15° C., simultaneously as the pollutants in the flue gases are adsorbed by the water and separated from the flue gases. Injected water that has evaporated in the evaporation zone will here be recondensed to drop shape. In the water or drop separator 8, the water is separated from the flue gases and discharged through the outlet 4. The energy content of the heated consumed water is recovered in some suitable manner, for example in the evaporator section of a heat pump (not shown). After the pollutants have been separated, the cooled water is recycled by means of the pump 101 to the nozzles 10 for renewed injection. Before they reach the outlet 3, the cooled flue gases which, after passing through the drop separator, are saturated with moisture, pass through the heat exchange portion 6 where they are heated. The outflowing flue gases then have a relatively low air humidity and can be discharged without difficulty through the chimney.

A preferred embodiment of the invention has been described above with reference to the accompanying drawing. Naturally, a number of modifications can be made without departing from the inventive concept. For example, the briefly mentioned heat exchanger 9 may comprise several heat exchangers located at different points around the smoke pipe 5 and also around the widened portion 6. Furthermore, the turbulator 13 and the flange 14 may be replaced by other means conducting the flue gases toward the heat exchange surface between hot and cold flue gases and producing a turbulent flow in order to promote heat exchange. Also the construction of the partition 151 may vary.

The invention is not restricted to the embodiment described above and illustrated in the drawing but may be modified in different ways within the scope of the appended claim.

I claim:

1. Scrubber comprising a casing (1) with an inlet (2) for flue gases, nozzle means for injecting water into said casing, an outlet (3) for flue gases, and an outlet (4) for water and substances separated from the flue gases, said inlet (2) and said flue gas outlet (3) being arranged at the same end of the casing, and the condensate outlet being arranged at the opposite end of said casing, and a smoke pipe (5) of varying area extending through said casing (1) up to said flue gas outlet (3) from the casing end having the condensate outlet (4), a widened portion (6) of said smoke pipe (5) forming a heat exchanger for transfer of heat from the incoming flue gases to the outgoing cooled flue gases, characterised in that the scrubber casing (1) is divided, by means of a partition (151) having a flue gas throughflow opening, into two spaces or zones (11, 12); that cold water injection nozzles (10) are provided in both of said zones for cooling the flue gases and evaporating the injected water in an upper such zone (11) provided in connection with the flue gas inlet, simultaneously as the water adsorbs any substances carried by the flue gases, and for condensing water vapour carried by the transferred flue gases and cooling the flue gases in a lower zone (12) provided in connection with the condensate outlet and an intake end of the smoke pipe (5); that the partition (151) separating the evaporation zone (11) from the condensation zone (12) is adapted to collect any nonevaporated water in said evaporation zone (11) and has a drain pipe which, via a recirculation pump (16), is connected to further water injection nozzles (17) in said evaporation zone (11) for reinjection of water already heated in said zone (11); and that the end of the smoke pipe (5), positioned in said condensation zone (12) and provided with a widened portion (7), comprises a drop separator (8) for separating water in liquid form from the flue gases which enter the smoke pipe (5) and which, when passing another widened smoke pipe portion (6) arranged at the flue gas inlet and serving as heat exchanger, are again supplied with heat reducing the relative humidity.

* * * * *